(12) United States Patent
Domb et al.

(10) Patent No.: US 6,262,183 B1
(45) Date of Patent: Jul. 17, 2001

(54) HYDROXAMIC ACID POLYMERS FORMED FROM PRIMARY AMIDE POLYMERS

(75) Inventors: Abraham J. Domb, Brookline; Robert S. Langer, Somerville; Ernest G. Cravalho, Wellesley Hills, all of MA (US); Gershon Golomb, Jerusalem (IL); Edith Mathiowitz, Brookline, MA (US); Cato T. Laurencin, Philadelphia, PA (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 08/219,160

(22) Filed: Mar. 28, 1994

Related U.S. Application Data

(63) Continuation of application No. 07/837,126, filed on Feb. 14, 1992, now abandoned, which is a continuation of application No. 07/341,317, filed on Apr. 21, 1989, now abandoned, which is a continuation of application No. 07/019,066, filed on Feb. 26, 1987, now abandoned.

(51) Int. Cl.[7] .................................................. C08F 20/56
(52) U.S. Cl. .................... 525/329.4; 525/329.5; 525/380
(58) Field of Search ............................... 525/329.4, 329.5, 525/380

(56) References Cited

U.S. PATENT DOCUMENTS 2,959,574 * 11/1960 Woodberry .
4,536,296 * 8/1985 Vio .

FOREIGN PATENT DOCUMENTS

0104970 * 4/1984 (EP) .

\* cited by examiner

*Primary Examiner*—David W. Wu
*Assistant Examiner*—William Cheung
(74) *Attorney, Agent, or Firm*—Frank M. Van Riet; Claire M. Schultz

(57) ABSTRACT

Hydroxamic acid polymers which are comprised of hydroxamic groups and carboxylic acid groups wherein the carboxylic acid groups constitute less than about 3% of the functional groups.

The polymers hereof are also especially useful in biomedical applications because, for example, the low concentration of carboxylic acid groups decreases the incidence of bioincompatibility. Additionally, the polymers exhibit anticoagulant activity, urease inhibition activity, metal chelating activity and ion exchange activity.

17 Claims, No Drawings

HYDROXAMIC ACID POLYMERS FORMED FROM PRIMARY AMIDE POLYMERS

"This is a continuation of application Ser. No. 07/837,126, filed on Feb. 14, 1992, abandoned which, in turn, is a continuation of Ser. No. 07/341,317, filed Apr. 21, 1989 abandoned which, in turn, is a continuation of Ser. No. 07/019,066, filed Feb. 26, 1987 abandoned."

BACKGROUND OF THE INVENTION

The United States government has rights in this invention by virtue of National Institute of Health grant No. GM25810.

Hydroxamic acids are known for their special ability to form complexes with heavy metals, particularly iron(III). The intense colors and the high stabilities of many of these complexes have led to the development of various analytical procedures based upon these reactions. A number of hydroxamic acids also show biological activity, such as urease inhibition and anticoagulant activity.

Although the literature on hydroxamic acids is extensive and the chemistry well defined, there is little concerning polymers bearing hydroxamic acid groups.

In one case, vinyl monomers bearing hydroxamic acid groups were reported to polymerize under a variety of conditions. The monomers acrylo-, methacrylo-, crotono-, and cinnamohydroxamic acids were prepared by reaction of the corresponding ester with hydroxylamine. In a second case, however, Becke and Mutz, *Chem. Rev.*, 98,1322 (1965), reported an unsuccessful attempt to prepare acrylohydroxamic acid from ethyl acrylate due to competing Michael addition. Use of the acid chloride was successful, but with only an 8% yield of pure monomer. M. Narita et al.in *Bull. Chem. Soc.Japan*, 45,3149 (1972) reported the preparation of methacrylohydroxamic acid from the ester, but found that the monomer resisted attempts at copolymerization with styrene-divinylbenzene.

In other reports, the hydroxamic acid group is generated on or added to preformed polymers of various kinds. U.S. Pat. No. 2,402,604 discloses treatment of maleic anhydride copolymers with hydroxylamine, as does Cocea et al. in *Bul.Inst.Politeh.Iasi* 11,159 (1965) *Chem.Abst.* 64 19800a (1966). Various groups have also used the treatment of polyacrylonitrile with hydroxylamine followed by hydrolysis of the intermediate amidoxime, yielding, in part, pendant hydroxamic acid groups, for the metallation of acrylic fabrics.

Ion exchange resins based upon the hydroxamic acid groups have been prepared from Amberlite XRC-50 by conversion of the carboxyl groups to the acid chloride or to the ester, followed by treatment with hydroxylamine. Used in a column, the modified resin shows a significant increase in the retardation of various metal ions. The acid chloride method has also used by M. Vrancken and G. Smets in *J.Polym.Sci.*, 14,521 (1954) by treating poly (acryloyl chloride) with hydroxylamine in dimethylformamide. The copolymerization of various hydroxamic acid-substituted phenols and catechols into phenolic resins has been reported to give a fairly selective ion exchange resin for heavy metals.

The reaction of esters with hydroxylamine, normally a standard procedure for preparing hydroxamic acids, has been used by M. Narita et al, *Bull.Chem.Soc. Japan* 45,3149 (1972); by W. Kern and R. C. Schultz, *Agnew Chem.* 69, 153, (157); and by M. Hatano et al in *Koyo Kagakev Zasshi* 69, 571 (1966) and *Chem Abstr.* 65, 15532g (1966), in a number of instances, with mixed results, for preparing polymers. Of particular note is the work of Kern and Schultz, who, through reaction of poly(zethylacrylate) with hydroxylamine, reported a polymer containing to 80% acrylohydroxamic acid, 14% acrylic acid, and 6% methyl acrylate, and which formed the characteristic red-brown iron(III) complex. The ratio of hydroxamic acid to iron in the complex was found to be 3:1.

In other reports, styrene-divinylbenzene copolymers containing ethyl acrylate or the active esters p-nitrophenyl acrylate or p-nitrophenyl methacrylate either failed to react with hydroxylamine or resulted in polymers containing a considerable fraction of carboxyl groups. However, hydroxamic acid polymers could be prepared through reaction of the active ester substituted polymer with O-benzylhydroxylamine followed by treatment with hydrogen bromide.

In searching for polymeric chelating agents for treating cases of extreme iron poisoning, the trihydroxamic acid, deferoxamine-B, has been grafted to several polymers through reaction at the free amine group.

Vernon et al in *Anal.Chim.Acta* 72,331(1974); 77,145 (1975); 79,229 (1975); 82,369 (1976) and 83,187 (1976) described the preparation and applications of poly (hydroxamic acids)s. The preferred synthesis route was partial hydrolysis of macroporous acrylonitrile divinylbenzene copolymer, followed by hydroxylaminolysis. These resins are used for the separation of metal ions and recovery of uranium from synthetic sea water. A. Winston and E. T. Mazza in *J.Polym.Sci.Polym.Chem.Ed*. 13,2019(1975) and 14,2155(1976) studied the effect of the spacing of hydroxamic acid units in a polymer on its affinity to iron ions. Poly(hydroxamic acid)s were synthesized from acryloyl chloride and B-alanine or from poly(acrylic acid).

R. Phillips and J. S. Fritz in *Anal.Chim.Act*, 121, 225 (1980) synthesized an N-phenylhydroxamic acid resin by attaching N-Phenylhydroxamic acid units to Amberlite XAD-4. The use of poly(acrylonitrile) for the synthesis of poly(hydroxamic acid) was also reported by A. Shah and S. Devi in Analyst 110,1501, (1981). The polymer was used for the separation of lead and copper from aqueous solutions.

U.S. Pat. No. 4,536,296 to Vio discloses using drilling mud with low viscosity and stability at temperatures of up to 200° C. which contains one to ten grams low molecular weight (preferably 10,000) polymer or copolymer having hydroxamic or thiohydroxamic functional groups. The polymers are prepared by polymerization of a vinyl monomer having a hydroxamic or thiohydroxamic functional group alone or in combination with another vinyl monomer at a temperature between about 50° and 110° C. in the absence of oxygen, at a pH of less than 7, for between 0.5 and 20 hours. European Pat No. 0 104,970 to Societe National Elf Aquitaine (Vio and Meunier) discloses a similar method for making drilling mud wherein an aqueous solution of polyacrylamide is reacted at a temperature between 50° C. and 85° C.

Despite the variety of suggested polymers and applications, no one has ever disclosed, nor even suggested, a method using primary amide polymers, such as poly (acrylamide)s, as starting materials for the synthesis of hydroxamic acid polymers where the polymers are reacted with hydroxylamines at low temperature under basic conditions to yield a polymer containing low concentrations of carboxylic acid groups, in addition to the major content of hydroxamic acid groups.

It is therefore an object of the present invention to provide a method to produce polymers having a predominance of hydroxamic acid groups and a very low percentage of caboxylic groups which are relatively inert and biocompatible.

It is a further object of the present invention to provide a method to produce polymers which are biologically active.

It is a still further object of the present invention to provide a method to produce polymers which have high affinity for metal ions and a rapid reaction rate.

SUMMARY OF THE INVENTION

The method of the present invention is to react primary amide polymers, including but not limited to polyacrylamide, derivatives thereof, and other linear, branched and crosslinked primary amide polymers, with hydroxylamine under mild conditions. "Mild conditions" are preferably a temperature in the range of 20° C. to 30° C. and a pH of greater than about 7, preferably at least 10, and more preferably pH 11.5 or greater. The products of this method, produced in high yield, are the corresponding poly (hydroxamic acid)s predominantly containing hydroxamic acid groups as well as unreacted amide groups and low amounts of carboxylic acid groups. The method is as follows:

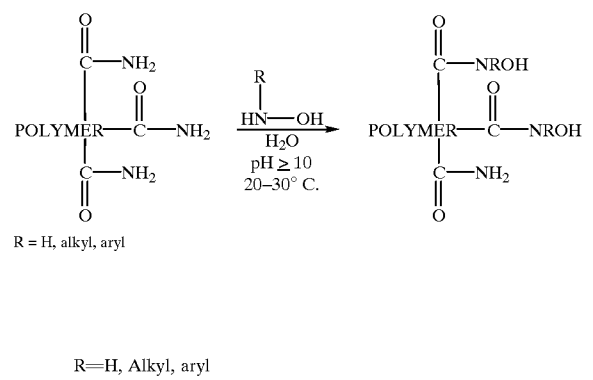

R = H, alkyl, aryl

R=H, Alkyl, aryl

The products of this method are distinguished by the high content of hydroxamic acid groups (70%) and low content of carboxylic acid groups (less than about 15%, usually less than about 3%). Selection of the starting materials and crosslinking with a divinyl compound can be used to determine the water retention capacity. The polymer shows high affinity for iron(III) and copper(II) in the pH range of 0 to 7 and has a high binding rate. This metal affinity is higher than the poly(hydroxamic acid)s previously described. The products are especially useful as ion exchangers, in drilling muds and in biomedical applications such as in anticoagulant coatings and in urease inhibition.

In one example, poly(acrylamide) (PAA) is converted into the corresponding poly(hydroxamic acid) (PHA) by reacting the PAA with an aqueous solution of hydroxyl amine at pH 14 at room temperature for five hours.

In a second example, the biological activity of the PHA as an urease inhibitor is demonstrated.

DETAILED DESCRIPTION OF THE INVENTION

In general, any linear, branched, or crosslinked primary amide polymer can be reacted with hydroxylamine according to the method of the present invention to yield poly (hydroxamic acid)s predominantly having hydroxamic acid groups, unreacted amide groups and low concentrations of carboxylic acid groups, less than 15% and usually less than 3%. The preferred polymers are polyacrylamide and derivatives thereof such as polymethacrylamide, polyethaorylamide, sulfur derivatives of polyacrylamide, and copolymers of acrylamide with-vinyl monomers and divinyl crosslinkers. Useful crosslinking agents include bisacrylamide, divinyl benzene and ethyleneglycol dimethacrylate.

Although procedures are known to those skilled in the art for reacting primary amides with hydroxylamine to produces polymers, these methods do not produce products having a low concentration of carboxylic groups, a high reaction rate and binding affinity for metals, nor are the polymers produced in a satisfactory yield. It is crucial to the present inventilcc the temperature (i.e. approximately room temperatures time and pH (i.e. greater than pH 7 and preferrably between pH 10 and 14) of the reaction if useful polymers are to be obtatned. The prior art methods all use higher temperatures at acid pH's. The crosslinking of the polymer, as well as the choice of the starting materials, can also be selected to result in a polymer having a desired hydrophobicity and water regain.

The poly(hydroxamic acid)s produced according to the present invention are useful as ion exchangers, in the removal and isolation of heavy metals and other precious metals, and in drilling muds made of clay, density increasing materials, and viscosity increasing agents. They are also especially useful in biomedical applications since the amide groups are natural and relatively inert and the low concentration of carboxylic acid groups decreases the incidence of bioincompatibility. In particular, it is possible to use the poly(hydroxamic acid)s formed using the disclosed method as anticoagulant coatings on medical devices and as in vivo urease inhibitors. Due to the polymeric nature of the poly (hydroxamic acid)s, anticoagulant coatings may be formed on devices such as catheters, infusion pumps, etc. which thereby help to overcome the long-standing problem of in vivo devices causing blood clotting. Some poly(hydroxamic acid)s can also be injected to aid in the removal or prevention of renal calculi.

The following non-limiting examples are included to further illustrate the method and products of the present invention.

Preparation of Polycrylamide (PAA)

Cross linked (PAA) is prepared by polymerizing a solution of acrylamide and bis(acrylamide) (95:5 molar ratio, 30 g in 100 ml of water) with ammonium persulphate (2 ml, 2% w/v in water) and tetramethylethylenediamine (0.2 ml, 1% w/v in water) at room temperature. A gel is formed after 20 minutes of reaction. The reaction is allowed to continue for 24 hours and the gel crumpled and washed with 2 liters of water. When soluble polymer is prepared, crosslinker is not added. Polymer is separated from the reaction solution by precipitation in methanol.

Reaction of PAA with Hydroxylamines

A solution of hydroxylamine-hydrochloride (21 g in 100 ml water) is added to a suspension of 20 g dry PAA in 300 ml water. After 30 minutes stirring at room temperature, a solution of NaOH is added (15 g in 50 ml water). The reaction is allowed to continue for 24 hours at room temperature. The resulting white polymer is washed with water, 3 N hydrochloric acid solution and again with water until chloride-free. When soluble polymer is used, the reaction solution is acidified and the polymer separated from the reaction mixtue by precipitation in methanol.

Physical and Chemical Characteristics of PHA

The sodium capacity of 5 g of the moist polymer is determined after equilibration with 10 ml of 1 M sodium bicarbonate solution for 48 hours, filtration and washing with distilled water. The total filtrate is acidified with 10 ml 1 N hydrochloric acid, boiled to remove $CO_2$ and back-titrated with 1 N sodium hydroxide solution.

The fully swollen resin is dried at 95° C. overnight to determine the weight of water associated with 1 g of resin.

The metal capacities of 5 g of fully hydrated resin is measured after equilibrating for 48 hours with 15 ml of metal solutions at various pH. The metal capacity is determined from the decrease in metal ion concentration after equilibration, gravimetrically and from the resin after reaction with 2 M $H_2SO_4$. 0.1 M metal solutions of various pH are prepared for testing by dissolving $CuCl_2$ or $FeCl_3$ in 1 M $Na_2SO_4$ and adjusting the pH by adding 0.1 N $H_2SO_4$ solution.

The iron(III) and copper(II) are determined spectrophotometrically according to the method found in the *Handbook of Analytical Chemistry*, L. Meites, ed., 1st ed.,12–14 (McGraw-Hill 1962). $t_{1/2}$ to 50% saturation is determined by equilibrating 5 g of the moist polymer (0.33 g dry polymer) with 30 ml of 0.1 M $CuCl_2$ solution pH 7. The reaction is followed by the decrease in $Cu^{+2}$ in the solution as measured by visible spectrophotometer at 810 nm using a calibration curve.

Table 1 summarizes the properties of the poly (hydroxamic acid) ion exchanges. The sodium hydrogen exchange from sodium hydrogen carbonate solution is a measure of the carboxylic acid groups produced by hydrolysis of the amide during the preparation. The hydroxamic acid units are not reactive toward hydrogen carbonate. The sodium capacity shows that the polymer contains only 0.4 mmole carboxylic acid groups/g of polymer. The water regain of the PHA is 10.5. This is much higher than the value reported for most PRA previously described in the literature, water regain of around 2. The higher water regain is a result of the high hydrophilicity of the amide and hydroxamic acid groups. The PHA with similar crosslinking reported in the literature contains hydrophobic groups such as esters and nitriles, which lowers the hydrophilicity of the polymers.

TABLE 1

Physical and Chemical Characteristics of PHA

|  | crosslinked | linear |
|---|---|---|
| Percent of crosslinking | 5 | 0 |
| water regain | 10.5 gg$^{-1}$ | soluble |
| sodium-hydrogen exchange capacity | 0.4 mmole g$^{-1}$ | 0.3 mmole g$^{-1}$ |
| copper(II) capacity at pH 5 | 3.2 mmole g$^{-1}$ | 3.0 mmole g$^{-1}$ |
| iron(III) capacity at pH 5 | 3.2 mmole g$^{-1}$ | 3.0 mmole g$^{-1}$ |
| equilibration rate (t½)* | 5 min. | 5 min. |

*determined for $Cu^{+2}$ at pH 5.0

The elemental analysis of the PHA is summarized in Table 2. The nitrogen and oxygen analysis of the PHA shows a high conversion to hydroxamic acid groups. Based on the nitrogen and oxygen analysis of the PRA and the sodium bicarbonate titration, the polymer contains: 9.7 mmole hydroxamic groups/g (70 molar %), 0.4 mmole carboxylic acid groups/g (3 molar %) and 3.5 mmole unreacted amide groups/g (24 molar %). The low acid content is due to the mild conditions used on the polymer during the hydroxamic acid formation which minimize hydrolysis.

TABLE 2

Elemental analysis of PHA

|  | % C | % H | % N | % O |
|---|---|---|---|---|
| Poly(hydroxamic acid) | 44.69 | 6.68 | 16.05 | 31.46 |
| Poly(acrylamide) | 52.1 | 6.92 | 18.74 | 22.86 |
| Poly(hydroxamic acid)[1] | 42.50 | 5.74 | 15.74 | 35.99 |
| Poly(acrylamide)[2] | 51.29 | 6.92 | 18.99 | 22.80 |

[1]Calculated on the basis of 100% conversion of 5 molar % crosslinked poly(acrylamide).
[2]Calculated for poly(acrylamide) crosslinked with 5% bis(acrylamide) Mw = 73.7

On addition of a solution of Fe(III) or Cu(II) to the fully hydrated polymer, the gel turns dark brown and green respectively, with the color deepening as the metal ion is consumed. After a few minutes of ion uptake, the polymer gel contracts to a powder, like the dry polymer, the polymer no longer possessing the character of a polymer gel.

The copper is removed from the polymer in a 2 M $H_2SO_4$ solution. Removal of the iron requires a solution of 4 M $H_2SO_4$. As a control, poly-(acrylamide) is reacted with copper and iron solutions under the same conditions. No absorption of metals to the polymer is observed, the polymer gel remaining uncolored.

The iron(III) and copper(II) capacities of the PRA at various pH are described in Table 3. The ion exchanging capacities were determined spectrophotometrically from the decrease in ion concentration in the reacted solution after equilibration, or gravimetrically from the increase in weight of the polymer after reaction. Results of both determinations are close and show binding of around 3 mmole of both metals/g of polymer. The metal binding is pH dependent. No copper is bound in 1 N $H_2SO_4$ while iron (III) shows some binding. Increasing the pH increases the capacities. At pH 3, the polymer reaches the maximum capacity which remains constant with an increase in pH. Assuming that three hydroxamic acid groups are involved in the binding of one iron(III) ion, the hydroxamic acid content is around 9 mmole/g. This is similar to the results obtained from the elemental analysis.

TABLE 3

Iron(III) and copper(II) binding to poly(hydroxamic acid)*

| pH of metal solution | Iron(III) spectrophoto. | (mmole/g) gravimetric | copper(II) spectrophoto. | (mmole/g) gravimetric |
|---|---|---|---|---|
| 1 N $H_2SO_4$ | 1.5 | 0.4 | 0 | 0 |
| pH 1 | 2.8 | 2.4 | 0.2 | 0.1 |
| pH 3 | 3.2 | 2.8 | 2.7 | 2.9 |
| pH 5 |  |  | 3.0 | 3.1 |

*5 g of fully hydrated PHA (0.26 g dry polymer) were reacted with 15 ml of 0.1 M $FeCl_3$ or $CuCl_2.2H_2O$ at room temperature for 24 hours. Metal capacities were determined from the decrease in ion concentration in the reacted solutions, or gravimetrically from the increase in weight of the isolated PHA-metal complex. Metal capacities were measured at pH greater than or equal to 3 for $FeCl_3$ and pH less thanor equal to 5 for $CuCl_2$, higher pH causing a precipitation in metal solutions.

As demonstrated by Table 4, the reaction is strongly pH dependent. The reaction rate is most rapid at high pH, yielding the highest metal affinities per gram of polymer when the hydroxylamine and PAA are reacted for the same length of time, varying only the pH. However, the equivalent polymer is produced at pH 8.1 reacted for one week as at pH 11.5 reacted for 24 hours;.

TABLE 4

Reaction between PAA and hydroxylamine at various pH[a]

| Run No. | pH | NH$_2$—OH.HCl/ NaOH | Complexation (mmole/g dry polymer) | |
|---|---|---|---|---|
| | | | Fe$^{+3}$ | Cu$^{+2}$ |
| 1 | 6.8 | — | 0 | 0 |
| 2 | 9.0 | — | 0 | 0 |
| 3 | 11.0 | — | 0.3 | 0 |
| 4 | 14 | 1:1.1 | 1.2 | 0.3 |
| 5 | 14 | 1:1.2 | 2.0 | 1.05 |
| 6 | 14 | 1:1.5 | 3.3 | 2.0 |
| 7 | 14 | 1:2.0 | 3.2 | 3.0 |
| 8 | 14 | 1:3.0 | 3.4 | 3.2 |
| 9 | 14 | NaOH only | 0 | 0.5 |
| 10 | 6.8[b] | — | 1.5 | 0.6 |
| 11 | 8.1 | 1:5 NaHCO$_3$ | 0 | 0 |
| 12 | 11.5 | 1:5 Na$_2$CO$_3$ | 0.8 | 0.2 |

[a]6 g of the 50% hydrated pAA - 5% BAA (1.0 g dry polymer) were reacted with 10 ml aqueous solution of 1.2 g NH$_2$—OH.HCl (1:1.2 molar ratio, acrylamide units : hydroxylamine) at room temperature for 24 hours. pH was adjusted by adding 2 M NaOH solution. At stronger basic conditions a solution of NaOH (50% in H$_2$O) was added. After acidification and purification the polymer was reacted with 50 ml 0.1 M Fe(III) in pH 1 or Cu(II) at pH 5 for 24 hours.
[b]Reaction was performed at 70° C. for 8 hours.

PHA as an Inhibitor of Urease Production

Urease-producing bacteria is known to play an important role in the formation of infection-induced urinary stones. The clinical drug of choice is acetyl hydroxamic acid (AHA).

It would be desirable to have a polymeric drug for the following reasons:

Polymers have a lower solubility than AHA so there is a longer residence time at the dispersion site.

Polymers can be used as coatings on devices such as catheters for localized treatment.

Controlled release tablets or pellets made from the soluble polymeric drug can be inserted into the bladder for slow release at the site of the infection.

PHA was tested for urease inhibition activity using the procedure of Griffith et al in *Investigative Urology* 13(5), 346–350(1976). Briefly, one square centimeter of agar slab containing a layer of urease forming bacteria, Proteus, was dissolved in 25 ml of artificial urine made of 25 g urea dissolved in one liter water. 30 mg polymer was added per ml urine and the mixture incubated overnight at 37° C. The production of ammonia, indicative of urease activity, was measured using an amino acid analyzer.

The results comparing AHA with soluble PHA (30 mg PHA/ml water), cross-linked PHA (30 mg dry powder), and crosslinked PAA are summarized in Table 5. Both PHA polymers exhibit urease inhibition activity similar to that of AHA. PAA, the starting material in the synthesis of the PHA, exhibits no urease inhibition.

TABLE 5

Urease Inhibition Activity of Hydroxamic Polymers

| Active Agent | Ammonia | % Activity* | % Hydroxamic Acid in active agent |
|---|---|---|---|
| AHA | 1165–1331 | 100 | 100 |
| soluble PHA | 1467–2111 | 77 | 70 |
| crosslinked PHA | 1625–2126 | 73 | 70 |
| crosslinked PAA | 3702–4630 | 0 | 0 |
| control | 3535–3768 | 0 | 0 |

*% activity was estimated relative to AHA from the ratio between the decrease in ammonia number of the polymer and AHA.

Modifications and variations of the method and products of the present invention, hydroxamic acid polymers having a low carboxylic acid content which are formed in high yield, will be obvious to those skilled in the art from the foregoing detailed description of the invention. Such modifications and variations are intended to come within the scope of the appended claims.

We claim:

1. Hydroxamic acid polymers comprising hydroxamic groups and carboxylic acid groups, wherein the carboxylic acid groups constitute less than about 3 mole percent of the functional groups.

2. The polymers of claim 1 wherein said polymers are formed by the reaction of primary amide polymers selected from the group consisting of acrylamide and linear, branched, crosslinked and substituted derivatives thereof.

3. The polymers of claim 1 wherein said polymers are formed by the reaction of primary amide polymers with a compound selected from the group consisting of hydroxylamine and substituted hydroxylamines.

4. The polymers of claim 2 wherein said polymers are reacted with a compound selected from the group consisting of hydroxylamine and substituted hydroxylamines at a temperature between about 20° C. and 30° C.

5. The polymers of claim 2 wherein said polymers are formed at a pH of greater than 7.

6. The polymers of claim 2 wherein said polymer is crosslinked with a divinyl compound and has a water retention capacity of between about 1.0 and 20 grams water per gram of polymer.

7. The polymer of claim 1 wherein said polymers have a binding affinity of approximately 3 mmole iron(III) per gram of polymer.

8. A polymeric material having anticoagulant activity comprising hydroxamic acid polymers having less than about 3 mole percent carboxylic acid functional groups.

9. The polymeric material of claim 8 wherein approximately 70% or more of the functional groups are hydroxamic acid groups.

10. The polymeric material of claim 8 formed from acrylamide or a derivative thereof and hydroxylamine or a derivative thereof.

11. A polymeric material having urease inhibition activity comprising hydroxamic acid polymers having less than about 3 mole percent carboxylic acid functional groups.

12. The polymeric material of claim 11 wherein approximately 70% or more of the functional groups are hydroxamic acid groups.

13. The polymeric material of claim 11 formed from acrylamide or a derivative thereof and hydroxylamine or a derivative thereof.

14. A metal cheleting agent comprising hydroxamic acid polymers having less than about 3 mole percent carboxylic acid functional groups.

15. The metal cheleting agent of claim 14 having a binding capacity of approximately 3 mmoles metal ions.

16. An ion exchange resin comprising hydroxamic acid polymers having less than about 3 mole percent carboxylic acid functional groups.

17. The ion exchanger of claim 16 having a sodium-hydrogen exchange capacity of approximately 0.4 mmole ions/gram of polymer.

* * * * *